US006363981B1

United States Patent
Butler et al.

(10) Patent No.: US 6,363,981 B1
(45) Date of Patent: Apr. 2, 2002

(54) LUBRICATION SYSTEM FOR A WOOD CUTTING MACHINE

(75) Inventors: Jeffry A. Butler, Aurora, IL (US); Robert H. Holmes, III, Bonifay, FL (US); Charles H. Menke, Bolingbrook, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/627,592

(22) Filed: Jul. 28, 2000

(51) Int. Cl.[7] .............................. A01G 23/08; F16N 7/14
(52) U.S. Cl. ...................... 144/24.13; 144/4.1; 144/343; 144/338; 83/169; 184/15.1; 184/27.1; 30/123.4
(58) Field of Search ................................ 144/24.13, 4.1, 144/335, 336, 343, 338; 83/169; 30/123.3, 123.4, 318; 184/15.1, 15.3, 16, 17, 77.1, 6.2

(56) References Cited

U.S. PATENT DOCUMENTS

| 4,016,956 A | 4/1977 | Karlsson |
| 4,132,289 A | 1/1979 | Makela |
| 4,884,340 A | 12/1989 | Newman |
| 5,143,131 A | 9/1992 | Seigneur et al. |
| 5,322,103 A | 6/1994 | Hudson |
| 5,647,456 A | 7/1997 | Gelb |
| 6,167,990 B1 * | 1/2001 | Peng .......................... 184/6.2 |

* cited by examiner

Primary Examiner—W Donald Bray
(74) Attorney, Agent, or Firm—James R. Smith

(57) ABSTRACT

In the operation of wood cutting machines such as delimbing machines which use chain saw cutting devices, it is common to either position the lubricating oil reservoir above the chain saw cutting device to create a gravity-fed system or couple a pump apparatus to the chain saw cutting device. Both arrangements may limit the flexibility of placement of the components comprising the lubrication system. The present invention provides a lubrication system for a wood cutting machine in which a receptacle receives lubricating fluid from the reservoir by use of a source of supply pressure within the receptacle. A source of discharge pressure operates on the receptacle to transport the lubrication fluid to the cutting chain device.

27 Claims, 3 Drawing Sheets

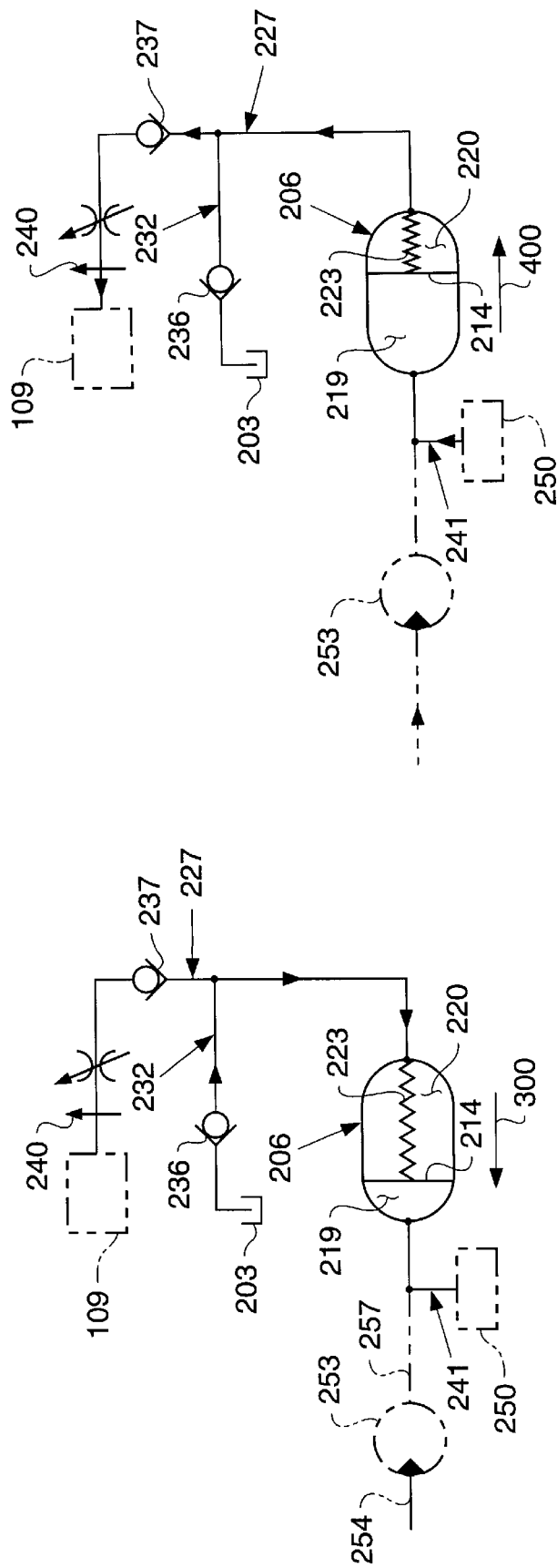

LUBRICATION SYSTEM FOR A WOOD CUTTING MACHINE

TECHNICAL FIELD

This invention relates to a lubrication system for a wood cutting machine, and more particularly to a lubrication system used to supply lubrication fluid to the chain saw device of a wood cutting machine.

BACKGROUND ART

In the operation of a wood cutting machine of the type having a chain saw cutting device, lubrication oil is typically gravity fed to the chain saw cutting device from a lubrication oil reservoir. Such gravity fed systems typically require placement of the reservoir above the chain saw device in order for the lubrication oil to reach its end destination. This placement of the reservoir above the chain saw is inconvenient because it requires the operator to climb to an elevated position each time the reservoir needs to be checked or filled.

Prior art attempts have been made in an attempt to eliminate the aforementioned problem. For example, U.S. Pat. No. 5,322,103 which issued to Hudson on Jun. 21, 1994, and U.S. Pat. No. 4,016,956 which issued to Karlsson on Apr. 12, 1977 both disclose lubrication systems for use with wood cutting machines. More specifically, each shows a mechanical pump device, operatively coupled with the chain guide bar, which receives and discharges lubrication oil with each respective successive raising and lowering of the chain guide bar. While these systems may be adequate for their intended purpose, the fact that each system must be operatively coupled to the chain guide bar limits the flexibility in locating the lubrication system. The present invention is directed to overcome one or more of the problems as set forth above.

DISCLOSURE OF THE INVENTION

In one aspect of the invention, a lubrication system for supplying a lubrication fluid to a chain saw cutting device, pivotable between a saw engaging position and a saw disengaging position is provided. The lubrication system includes a reservoir adapted for holding the lubrication fluid, and a receptacle coupled to the reservoir and arranged to receive a quantity of the lubrication fluid. The receptacle is operable between a lubrication fluid receiving mode and a lubrication fluid dispensing mode. A source of supply pressure within the receptacle is used to place the receptacle in the lubrication fluid receiving mode, and a source of discharge pressure is operatively coupled to the receptacle and is adapted for placing the receptacle in the lubrication fluid dispensing mode. The lubrication system may also include a first flow control device positioned between and coupled with the reservoir and the receptacle, and a second flow control device positioned between and coupled with the chain saw cutting device and the receptacle.

In another aspect of the invention, a lubrication system for supplying a lubrication fluid to a chain saw cutting device, pivotable between a saw engaging position and a saw disengaging position is provided. The lubrication system includes a reservoir adapted for holding the lubrication fluid, and a receptacle coupled to the reservoir and arranged to receive a quantity of the lubrication fluid. The receptacle is operable between a lubrication fluid receiving mode and a lubrication fluid dispensing mode. A source of supply pressure coupled to the receptacle is used to place the receptacle in the lubrication fluid receiving mode, and a source of discharge pressure is in fluid communication with the receptacle and is adapted for placing the receptacle in the lubrication fluid dispensing mode. The lubrication system may also include a first flow control device positioned between and coupled with the reservoir and the receptacle, and a second flow control device positioned between and coupled with the chain saw cutting device and the receptacle.

In yet another aspect of the present invention, a method for supplying a lubrication fluid to a chain saw cutting device of a wood cutting machine having a saw motor hydraulic circuit or a saw actuation hydraulic circuit is provided. The method comprising the steps of providing a receptacle having an internal chamber bifurcated into a first portion and a second portion by a plunger movably disposed therein, the first portion operably connected with at least one of the saw motor hydraulic circuit and a saw actuation hydraulic circuit, and the second portion operably connected with the chain saw cutting device. Also, providing a quantity of the lubrication fluid to the first chamber by moving the plunger internal to said receptacle, and moving the plunger in such a manner as to force the lubrication fluid from the second portion to the chain saw cutting device.

BRIEF DESCRIPTION OF THE DRAWINGS

FIG. 3 is a schematic view of the present invention illustrating the flow path of lubrication fluid to the chain saw cutting device.

FIG. 4 is a schematic view of the present invention illustrating the flow of lubrication fluid from the reservoir to the receptacle.

BEST MODE FOR CARRYING OUT THE INVENTION

Figure 1:
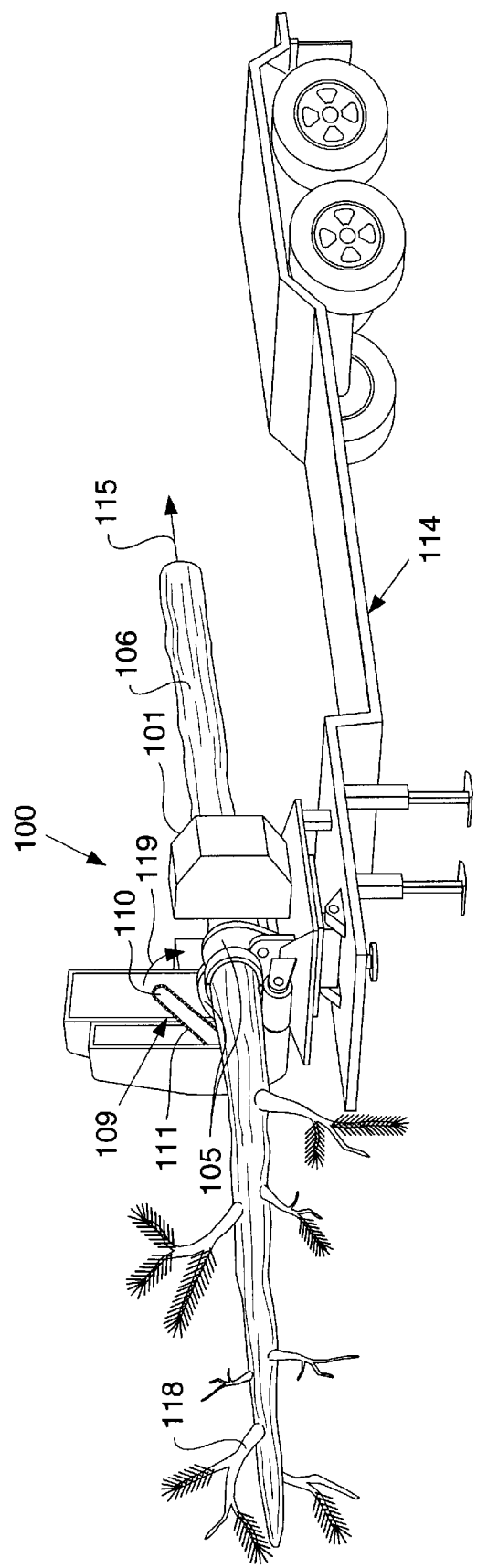
FIG. 1 is a perspective view of a wood cutting machine in which the present invention may be employed.

With reference now to the drawings, the preferred embodiment of the present invention is designed to be employed in a wood cutting machine 100 such as, for example, an exemplary delimbing and topping machine shown in FIG. 1. The wood cutting machine typically consists of a frame portion 101 having opposing pivotal stripping knives 105 mounted thereon for receiving the tree trunk 106 therebetween.

A chain saw cutting device 109 is used to cut the tree trunk at desired locations. The chain saw cutting device 109 includes a chain guide bar 110 having a cutting chain 111 mounted thereon. The chain guide bar 110 is pivotally mounted to the frame portion 101 with the aforementioned pivotal movement controlled by an appropriate mechanism such as, for example, a hydraulic cylinder (not shown). As shown, the assembly comprising the frame portion 101, stripping knives 105, and chain saw cutting device 109 may be mounted on a trailer unit 114 for ease of transport and to provide stability to the wood cutting machine 100 during use.

In normal operation, a tree trunk 106 is placed within the wood cutting machine 100 and the stripping knives 105 actuated to engage the tree trunk 106. The tree trunk 106 is then pulled through the stripping knives 105, in the direction of arrow 115, by suitable means such as a boom loader or the like resulting in the removal of the limbs 118 by the stripping knives 105. When it is desired to cut the tree trunk 106, the chain guide bar 110 is pivoted from its saw disengaging position, defined by that position in which the chain guide bar 110 is in a static, non-cutting state, to a saw engaging position, defined by the movement of the chain guide bar 110 in the direction of arrow 119, with the actuation of the cutting chain 111 about the chain guide bar 110, resulting in a cutting engagement between the cutting chain 111 and the tree trunk 106.

Figure 2:
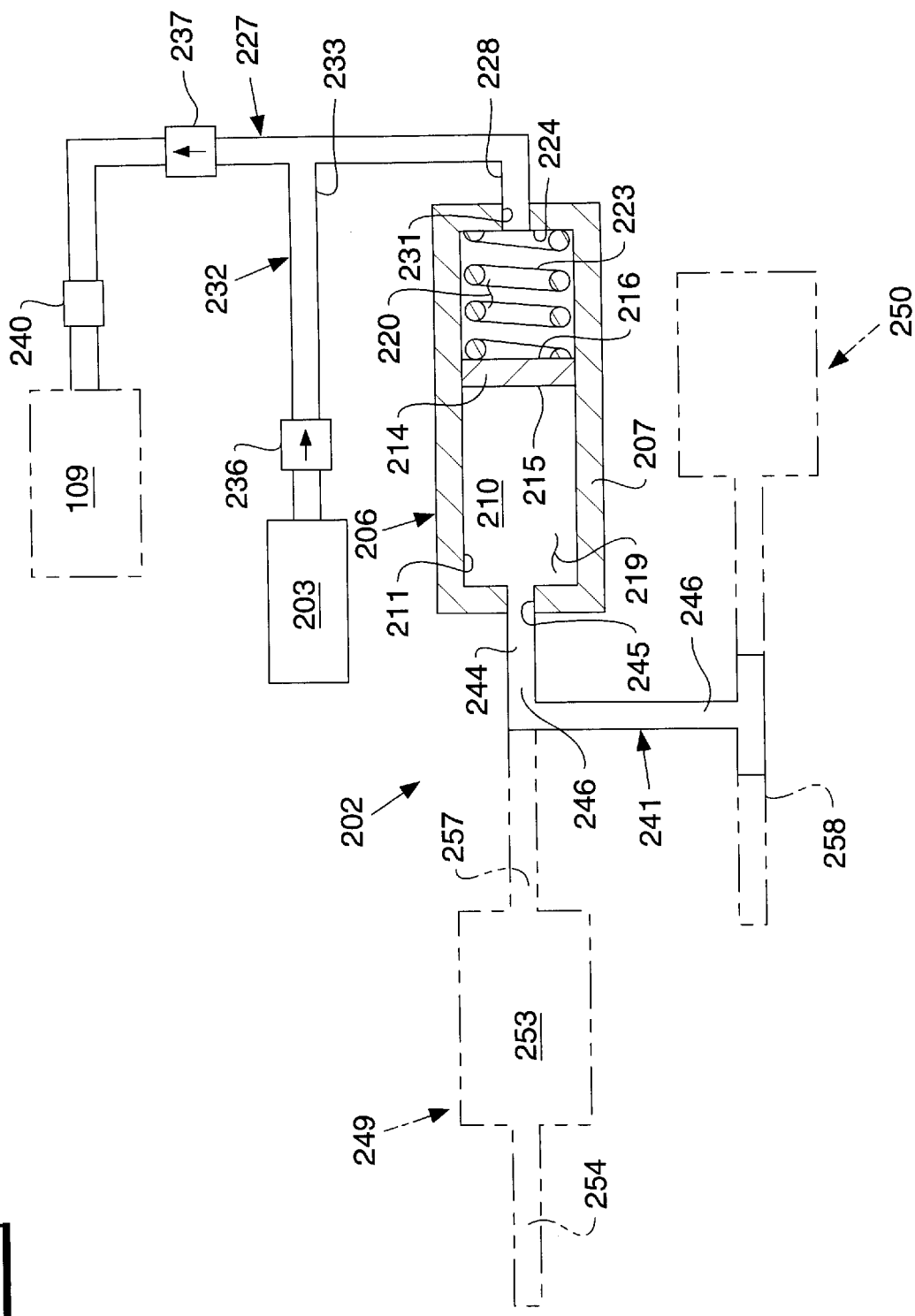
FIG. 2 is a diagrammatic partial cross-sectional view of the present invention as it would be positioned in a wood cutting machine.

Referring now to FIG. 2, it may be seen that the lubrication system 202 of the present invention includes a reservoir 203 for holding and making available a quantity of lubrication fluid (typically oil based). A receptacle 206 is arranged to receive a quantity of the lubrication fluid from the reservoir 203 which is to be transported to the chain saw cutting device 109. The receptacle 206 preferably comprises an accumulator-type device of the type consisting of a body 207 having an internal chamber 210 defined by an internal chamber wall 211. A plunger 214, having a pair of opposing plunger end portions 215,216 is placed within the internal chamber 210 and is adapted to sealingly engage the internal chamber wall 211. As shown, the plunger 214 bifurcates the internal chamber 210 into a first portion 219 and a second portion 220. The receptacle 206 also included a spring 223, interposed between the plunger end portion 216 and receptacle end portion 224.

A lubrication fluid discharge conduit 227 is sealingly engaged at end 228 to an aperture 231, provided in the second portion 220, and is used to transport lubrication fluid from the second portion 220 to the chain saw cutting device 109. Also shown is a lubrication fluid intake conduit 232 used to couple the receptacle 206 with the reservoir 203. The lubrication fluid intake conduit 232 is shown having an end 233 attached to, and in fluid communication with, the lubrication fluid discharge conduit 227. However, such a showing is exemplary only and not limiting as to other methods for coupling the reservoir 203 with the receptacle 206. To prevent backflow of the lubrication fluid into the reservoir 203, a first flow control device 236 is coupled to, and in fluid communication with, the lubrication fluid intake conduit 232 substantially between the reservoir 203 and the receptacle 206.

Likewise, a second flow control device 237 is coupled to, and in fluid communication with, the lubrication fluid discharge conduit 227 and is used to prevent drawing of the lubrication fluid back into the lubrication fluid discharge conduit 227 from the chain saw cutting device 109. In the preferred embodiment described herein, each respective first and second flow control device 236,237 preferably comprises a check valve (one-way valves) which are coupled to the respective conduits 227,232 in the orientation and location required to limit the flow of the lubrication fluid in the aforementioned manner. Also shown is a flow regulating device 240 coupled to, and in fluid communication with, lubrication fluid discharge conduit 227. The flow regulating device 240 preferably comprises a pressure compensated regulator device of the limited range adjustable type commercially available from HydraForce, Inc. (Lincolnshire, Ill.). As should be appreciated, the flow regulating device 240 is used to maintain a constant flow of lubrication fluid regardless of changes in fluid viscosity caused by, for example, temperature changes of the lubrication fluid.

The present invention also includes the use of a pressure intake conduit 241 which is sealingly engaged at its first end 244 to an aperture 245, provided in the first portion 219, and is coupled at its second end 246 to either the saw motor hydraulic circuit 249 or the saw actuation hydraulic circuit 250 (both shown in alternate detail), or both. When coupled in the aforementioned manner to the pressure intake conduit 241, both of the respective hydraulic circuits 249,250 function to transport pressurized fluid (typically hydraulic fluid) to the first portion 219 of the internal chamber 210. Although both the aforementioned saw motor and saw actuation hydraulic circuits 249,250 are typical hydraulic circuits commonly used in connection with wood cutting machines of the type described herein, a brief description of each will be provided as follows.

The saw motor hydraulic circuit 249 typically comprises a hydraulic motor 253 which is used to drive the cutting chain 111 about the chain guide bar 110 and is activated by pressurized hydraulic fluid being supplied to the motor 253 through motor intake conduit 254. Pressurized fluid exits the motor 253 through motor exiting conduit 257 and typically returns to a hydraulic fluid reservoir (not shown). The saw actuation hydraulic circuit 250 is used to reciprocate the chain saw cutting device 109 into the aforementioned saw engaging and disengaging positions by use of such means as a hydraulic cylinder (not shown) coupled to the source of pressurized hydraulic fluid by at least one hydraulic line 258.

As shown in FIGS. 3 and 4, the receptacle 206 operates as a lubrication fluid pump in which lubrication fluid is transferred from the reservoir 203 to the chain saw cutting device 109. As should be appreciated, the source of supply pressure for providing the receptacle 206 with lubrication fluid consists of the spring 223 which is contained within the internal chamber 210. In addition, the source of discharge pressure consists of pre-existing components used in conjunction with typical chain saw cutting devices consisting of either the saw motor hydraulic circuit 249 and/or the saw actuation hydraulic circuit 250.

INDUSTRIAL APPLICABILITY

The lubrication system 202 of the present invention functions to provide a quantity of lubrication oil to the chain saw cutting device 109 when the chain guide bar 110 is reciprocated into a saw engaging position. A receptacle 206 is coupled to the reservoir 203 and operable between a lubrication fluid receiving mode and a lubrication fluid dispensing mode. Placement of the receptacle 206 in the fluid receiving mode will be explained as follows with reference to FIG. 3. Placing the chain saw cutting device 109 in the saw disengaging position causes evacuation of hydraulic pressure from the first portion 219 which releases tension in the spring 223 causing the plunger 214 to move, relative to the receptacle 206, in the direction of arrow 300. As the plunger 214 continues to move the direction of arrow 300, a vacuum is formed in the second portion 220 causing lubrication fluid to be drawn therein where it is stored for application to the chain saw cutting device 109.

FIG. 4 illustrates the placement of the receptacle 206 in the lubrication fluid dispensing mode. When it is desired to use the chain saw cutting device 109 to cut the wood, the chain saw cutting device 109 is reciprocated to the saw engaging position causing pressurization of the saw actuation hydraulic circuit 250 and saw motor hydraulic circuit 249. This increase in pressure within the aforementioned hydraulic circuits 249,250 causes hydraulic fluid to accumulate within the first portion 219, via pressure intake conduit 241, thereby causing the plunger 214 to move in the direction of arrow 400 against the biasing force of the spring 223. As the plunger 214 continues to move in the direction of arrow 400, lubrication fluid is forced from the second portion 220 into the lubrication fluid discharge conduit 227, through the second flow control device 237, and ultimately unto the chain saw cutting device 109.

As should be appreciated by those skilled in such art, by providing the source of lubrication fluid supply pressure internal to the receptacle 206, via the spring 223, allows for flexibility in the placement of the lubrication system 202, relative to the wood cutting machine 100. In addition, using the plunger 214 to draw lubrication fluid into the receptacle 206 allows for an accessible placement of the lubrication system 202 which can be either above or below the chain saw cutting device 109.

Other aspects, objects, and advantages of this invention can be obtained from a study of the drawings, the disclosure, and the appended claims.

What is claimed is:

1. A lubrication system for supplying a lubrication fluid to a chain saw cutting device, pivotable between a saw engaging position and a saw dis-engaging position, of a wood cutting machine of the type having at least one saw motor hydraulic circuit or saw actuation hydraulic circuit, said system comprising:
   a reservoir adapted for holding the lubrication fluid;
   a receptacle coupled to said reservoir and arranged to receive a quantity of the lubrication fluid, said receptacle operable between a lubrication fluid receiving mode and a lubrication fluid dispensing mode;
   a source of supply pressure within said receptacle and adapted for placing said receptacle in said lubrication fluid receiving mode;
   a source of discharge pressure operatively coupled to said receptacle and adapted for placing said receptacle in said lubrication fluid dispensing mode in which the lubricating fluid is transported to the chain saw cutting device;
   a first flow control device positioned between and coupled with said reservoir and said receptacle; and
   a second flow control device positioned between and coupled with the chain saw cutting device and said receptacle.

2. The lubrication system of claim 1 wherein said source of discharge pressure is arranged to be directly taken from at least one of the saw motor hydraulic circuit or saw actuation hydraulic circuit.

3. The lubrication system of claim 1 wherein said source of discharge pressure being substantially taken when the saw is being reciprocated to the saw engaging position.

4. The lubrication system of claim 1 wherein said source of supply pressure being substantially taken when the saw is being reciprocated to the saw dis-engaging position.

5. The system of claim 1 wherein:
   said source of discharge pressure being substantially taken when the saw is being reciprocated to the saw engaging position; and
   said source of supply pressure being substantially taken when the saw is being reciprocated to the saw disengaging position.

6. The lubrication system of claim 1 wherein said source of supply pressure is a spring.

7. The lubrication system of claim 1 wherein said receptacle comprises:
   a cylinder having an internal chamber defined by an internal chamber wall;
   a plunger, having a pair of opposing plunger end portions, moveably placed within said internal chamber and adapted to sealingly engage said internal chamber wall;
   a spring engageable with one of said plunger end portions; and
   said internal plunger bifurcating the internal chamber into a first portion and a second portion.

8. The lubrication system of claim 7 wherein said first portion is in fluid communication with at least one of said saw motor hydraulic circuit or saw actuation hydraulic circuit.

9. The lubrication system of claim 7 wherein said second portion is in fluid communication with said reservoir.

10. The lubrication system of claim 1 wherein said reservoir is adapted for placement a distance remote from said cutting chain bar either at elevation above or below the cutting chain device.

11. The lubrication system of claim 1 wherein said first and second flow control devices comprise check valves.

12. The lubrication system of claim 1 including a flow regulating device adapted for fluid communication with said reservoir between said reservoir and the chain saw cutting device.

13. A wood cutting machine for use with a lubrication fluid; comprising:
   a frame portion having attached therewith (i) at least a saw motor hydraulic circuit or a saw actuation hydraulic circuit, and (ii) a pair of opposing pivotal stripping knives;
   a cutting chain device operatively connected to said frame portion and pivotable between a saw engaging position and a saw dis-engaging position;
   a reservoir adapted for holding the lubrication fluid;
   a receptacle arranged to receive a quantity of the lubrication fluid, said receptacle operable between a lubrication fluid receiving position and a lubrication fluid dispensing position;
   a lubrication fluid intake conduit coupling said reservoir and said receptacle;
   a lubrication fluid discharge conduit coupling said receptacle with said cutting chain device;
   a pressure intake conduit coupling said receptacle with at least one of said motor hydraulic circuit or saw actuation hydraulic circuit;
   a first flow control device coupled to said lubrication fluid intake conduit; and
   a second flow control device coupled to said lubrication fluid discharge conduit; and
   a flow control device coupled to said lubrication fluid discharge conduit.

14. A lubrication system for supplying a lubrication fluid to a chain saw cutting device, pivotable between a saw engaging position and a saw disengaging position, of a wood cutting machine of the type having at least one saw motor hydraulic circuit or saw actuation hydraulic circuit, said system comprising:
   a reservoir adapted for holding the lubrication fluid;
   a receptacle coupled to said reservoir and arranged to receive a quantity of the lubrication fluid, said receptacle operable between a lubrication fluid receiving mode and a lubrication fluid dispensing mode;
   a source of supply pressure coupled to said receptacle and adapted for placing said receptacle in said lubrication fluid receiving mode;
   a source of discharge pressure in fluid communication with said receptacle and adapted for placing said receptacle in said lubrication fluid dispensing mode in which the lubricating fluid is transported to the chain saw cutting device;

a first flow control device positioned between and coupled with said reservoir and said receptacle; and a second flow control device positioned between and coupled with the chain saw cutting device and said receptacle.

15. The lubrication system of claim 14 wherein said source of discharge pressure is arranged to be directly taken from at least one of the saw motor hydraulic circuit or saw actuation hydraulic circuit.

16. The system of claim 14 wherein said source of discharge pressure being substantially taken when the saw is being reciprocated to the saw engaging position.

17. The system of claim 14 wherein said source of supply pressure being substantially taken when the saw is being reciprocated to the saw disengaging position.

18. The lubrication system of claim 14 wherein said source of supply pressure is a spring.

19. The lubrication system of claim 14 wherein said receptacle comprises:

a cylinder having an internal chamber defined by an internal chamber wall;

a plunger, having a pair of opposing plunger end portions, moveably placed within said internal chamber and adapted to sealingly engage said internal chamber wall;

a spring engageable with one of said plunger end portions; and said internal plunger bifurcating the internal chamber into a first portion and a second portion.

20. The lubrication system of claim 19 wherein said first portion is in fluid communication with at least one of said saw motor hydraulic circuit or saw actuation hydraulic circuit.

21. The lubrication system of claim 19 wherein said second portion is in fluid communication with said reservoir.

22. The lubrication system of claim 14 wherein said reservoir is adapted for placement a distance remote from said cutting chain bar either at elevation above or below the cutting chain device.

23. The lubrication system of claim 14 wherein said first and second flow control devices comprise check valves.

24. The lubrication system of claim 14 including a flow regulating device adapted for fluid communication with said reservoir between said reservoir and the chain saw cutting device.

25. A method for supplying a lubrication fluid to a chain saw cutting device of a wood cutting machine having a saw motor hydraulic circuit or a saw actuation hydraulic circuit, comprising the steps of:

providing a receptacle having an internal chamber bifurcated into a first portion and a second portion by a plunger movably disposed therein, said first portion operably connected with at least one of the saw motor hydraulic circuit and a saw actuation hydraulic circuit, and said second portion operably connected with the chain saw cutting device;

providing a quantity of the lubrication fluid to said first chamber by moving said plunger internal to said receptacle; and moving said plunger in such a manner as to force the lubrication fluid from said second portion to the chain saw cutting device.

26. The method of claim 14 wherein said step of providing said quantity of said lubrication fluid to said first chamber is by a spring disposed within said receptacle and operatively connected with said plunger.

27. The method of claim 14 wherein said step of forcing the lubrication fluid from said second portion is by fluid pressure.

* * * * *